United States Patent
Martin

(10) Patent No.: US 7,100,950 B2
(45) Date of Patent: Sep. 5, 2006

(54) CONNECTING ELEMENT

(75) Inventor: Uwe Martin, Bad Hersfeld (DE)

(73) Assignee: Siemens AG, München (DE)

( * ) Notice: Subject to any disclaimer, the term of this patent is extended or adjusted under 35 U.S.C. 154(b) by 112 days.

(21) Appl. No.: 10/846,590

(22) Filed: May 17, 2004

(65) Prior Publication Data

US 2004/0232694 A1 Nov. 25, 2004

(30) Foreign Application Priority Data

May 21, 2003 (DE) ................ 103 22 972

(51) Int. Cl.
*F16L 21/06* (2006.01)
(52) U.S. Cl. .............. 285/903; 285/319; 285/322; 285/323
(58) Field of Classification Search ............. 285/903, 285/319, 322, 323
See application file for complete search history.

(56) References Cited

U.S. PATENT DOCUMENTS

| | | | | |
|---|---|---|---|---|
| 4,621,842 A * | 11/1986 | Kowal et al. | ................ | 285/322 |
| 4,989,905 A | 2/1991 | Rajecki | | |
| 5,152,450 A * | 10/1992 | Okikawa et al. | ......... | 228/180.5 |
| 5,284,369 A * | 2/1994 | Kitamura | ................. | 285/322 |
| 5,462,313 A * | 10/1995 | Rea et al. | .................. | 285/21.1 |
| 5,511,827 A * | 4/1996 | Steinkamp et al. | ........... | 285/39 |
| 6,186,561 B1* | 2/2001 | Kaishio et al. | ............. | 285/319 |
| 6,254,145 B1* | 7/2001 | Schwarz et al. | ............ | 285/319 |
| 6,267,416 B1* | 7/2001 | Ferreira et al. | ............. | 285/319 |
| 6,435,567 B1* | 8/2002 | Kikumori et al. | ........... | 285/319 |
| 6,467,817 B1* | 10/2002 | Rhyman | .................... | 285/319 |
| 6,655,491 B1* | 12/2003 | Stoll et al. | .................. | 180/417 |
| 6,877,781 B1* | 4/2005 | Edler | ........................ | 285/322 |

FOREIGN PATENT DOCUMENTS

| | | |
|---|---|---|
| DE | 1992315 | 8/1968 |
| DE | 4020171 C1 | 12/1991 |
| DE | 8915932.2 | 6/1992 |
| DE | 19540279 A1 | 4/1997 |
| DE | 298 18 788 U1 | 2/1999 |
| DE | 19943764 A1 | 4/2001 |
| DE | 20104406 U1 | 9/2001 |
| DE | 20218734 U1 | 3/2003 |

OTHER PUBLICATIONS

Derwent Abstract—DE-40921171C1; May 12, 1999; Flexa GmbH & Co. Produktion und Vertrieb KG; D-6450 Hanau.
Derwent Abstract—DE-19540279A1; Apr. 30, 1997; Balfo Verwaltungs-Anstalt, LI-Balzers.

(Continued)

*Primary Examiner*—James M. Hewitt
(74) *Attorney, Agent, or Firm*—Siemens AG

(57) ABSTRACT

The connecting element for transporting gaseous, liquid or solid substances include a tubular coupling which has on the inside a cylindrically running first recess, in which a corrugated tube is arranged, and which has a cylindrically running second recess which adjoins the first recess and In which an annular seal is arranged adjacent to the first recess and an expanding ring is arranged adjacent to the annular seal. The expanding ring has, on the outside, a first projection which points toward the coupling and engages in an encircling groove arranged in the second recess. With its projection which points toward the corrugated tube, both the expanding ring and the annular seal are in each case in engagement with the corrugated tube from outside. The subject matter of the invention is also the use of the connecting element as a subassembly in windshield washer units.

2 Claims, 2 Drawing Sheets

OTHER PUBLICATIONS

Derwent Abstract—DE-29818788U1; Feb. 18, 1999; Truplast Kunststofftechnik GmbH; D-35428 Langgöns.
Derwent Abstract—DE-20218734U1; Mar. 27, 2003; Fränkische Rohrwerke Gebr. Kirchner GmbH+Co. KG, D-97486 Königsberg.
Derwent Abstract -DE-20104406U1; Sep. 20, 2001; Fränkische Rohrwerke Gebr. Kirchner GmbH+Co. KG, D-9748.
Derwent Abstract—DE -8915932.2; Jun. 11, 1992; Scepter Mfg. Co. Ltd., Don Mills, Ontario, Canada.
Derwent Abstract—DE-1992315; Aug. 22, 1968; Electrostark GmbH, D-7313 Reichenbach.
Derwent Abstract—DE- 19943764A1; Apr. 12, 2001; Schlemmer GmbH, D-85586 Poing.

* cited by examiner

FIG 2  DETAIL A

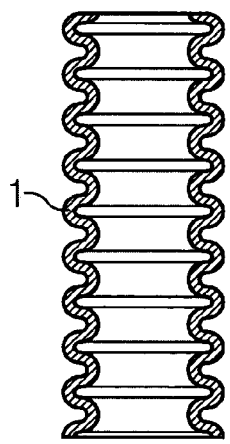
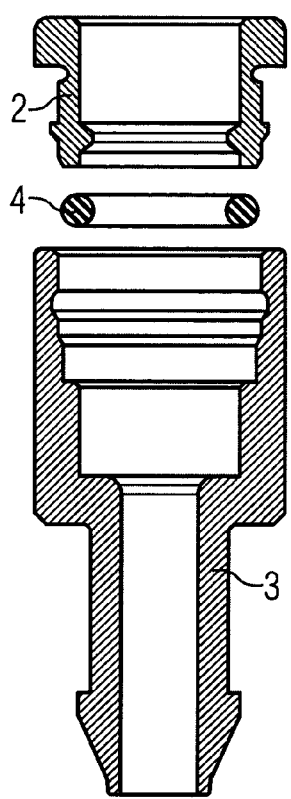
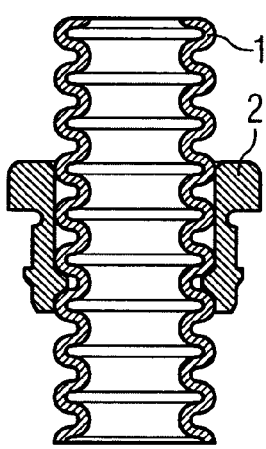
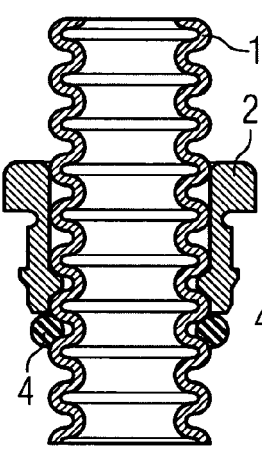
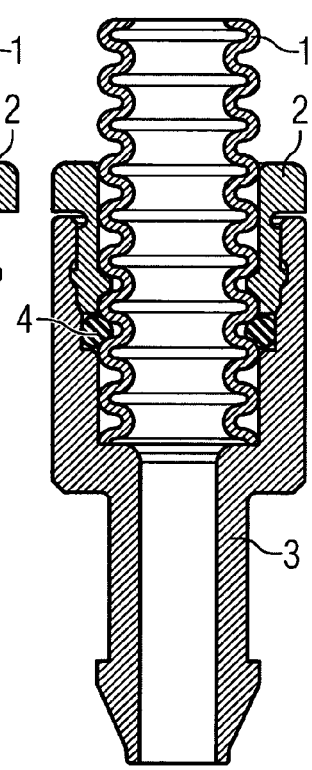

CONNECTING ELEMENT

BACKGROUND OF THE INVENTION

The invention relates to a connecting element for transporting gaseous, liquid or solid substances and to the use of the connecting element.

Connecting elements are known. A connection device for a corrugated tube line is described in DE 199 43 764 A1, this connection device having a connection piece with a nozzle for coupling to a corrugated tube piece and a locking collar for holding the corrugated tube piece on the nozzle. It is designed in such a way that, in a fastening state, a corrugated end section of the corrugated tube piece is put onto the nozzle, and the locking collar surrounds the corrugated tube piece.

SUMMARY OF THE INVENTION

An object of the invention is to provide a connecting element for transporting gaseous, liquid or solid substances, the individual parts of which connecting element are connected to one another in a virtually non-releasable manner in the assembled state. Another object of the invention is also to provide the use of the connecting element.

These and other objects of the invention are achieved by a connecting element for transporting gaseous, liquid or solid substances, which consists of a tubular coupling which has on the inside a cylindrically running first recess, in which a corrugated tube is arranged, and which has a cylindrically running second recess which adjoins the first recess and in which an annular seal is arranged adjacent to the first recess and an expanding ring is arranged adjacent to the annular seal, the expanding ring having, on the outside, a first projection which points toward the coupling and engages in an encircling groove arranged in the second recess, and in which the expanding ring, with a projection which points toward the corrugated tube, and the annular seal are in each case in engagement with the corrugated tube from outside. It has surprisingly been found that the parts of the connecting element are connected to one another in a non-releasable manner in the assembled state, so that, even during prolonged operating periods, a reliable connection especially between the corrugated tube and the coupling is ensured. In this case, it is advantageous that the arrangement of a connection nozzle of the tubular coupling, which connection nozzle engages in the corrugated tube, can be dispensed with. The connecting element is of relatively simple design, which allows problem-free assembly.

A preferred configuration of the invention consists in the fact that the coupling, at its end remote from the corrugated tube, is of mushroom-shaped design on the outside. In this case, it is advantageous that a further tube part can be pushed on in a simple manner at this end of the coupling.

Finally, the subject matter of the invention is the use of the connecting element as a subassembly in windshield washer units. As a rule, a plurality of connecting elements are arranged in windshield washer units, a fixed, non-releasable connection between corrugated tubes and coupling elements being important from time to time. On account of the design, the connecting element is therefore especially suitable as a subassembly in windshield washer units.

BRIEF DESCRIPTION OF THE SEVERAL VIEWS OF THE DRAWINGS

The invention is explained in more detail and by way of example below with reference to the drawing (FIG. 1, FIG. 2, FIGS. 3a)-d)).

FIG. 2 shows the detail A according to FIG. 1.

FIGS. 3a)-3d) show the connecting element in each case in longitudinal section step-by-step during the assembly.

DETAILED DESCRIPTION OF THE INVENTION

Figure 1:
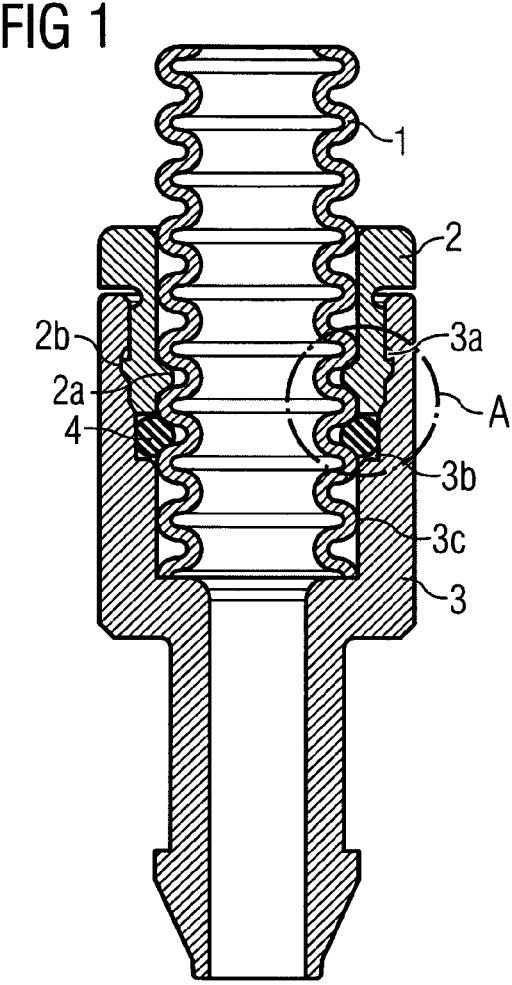
FIG. 1 shows the connecting element in longitudinal section.
Figure 1:
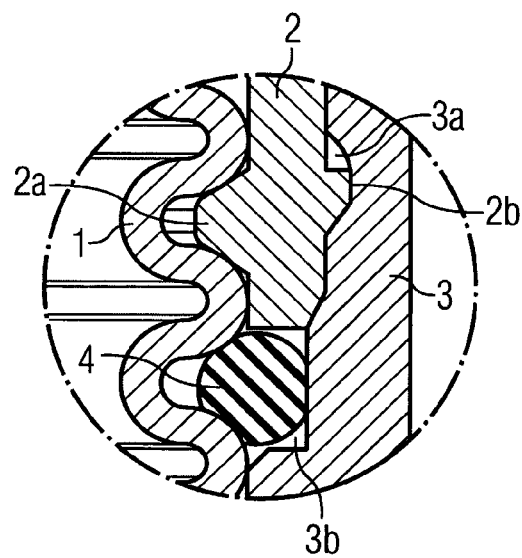

The connecting element is shown in longitudinal section in FIG. 1. It consists of a tubular coupling 3 which has on the inside a cylindrically running first recess 3c, in which a corrugated tube 1 is arranged. Furthermore, the tubular coupling 3 has a cylindrically running second recess 3b which adjoins the first recess 3c and in which an annular seal 4 is arranged adjacent to the first recess 3c and an expanding ring 2 is arranged adjacent to the annular seal 4. In this case, the expanding ring 2 has, on the outside, a first projection 2b which points toward the coupling 3 and engages in an encircling groove 3a arranged in the second recess 3b. The annular seal 4 and the expanding ring 2, with its projection 2a which points toward the corrugated tube 1, are in each case in engagement with the corrugated tube 1 from outside.

The detail A according to FIG. 1 is shown enlarged in FIG. 2. A non-releasable configuration is ensured by the respective arrangement of corrugated tube 1, expanding ring 2, coupling 3 and annular seal 4 relative to one another. In FIGS. 3a)–d), the connecting element is in each case shown in longitudinal section according to its individual steps during the assembly. Shown in FIG. 3a) is the state in which the corrugated tube 1, the expanding ring 2, the coupling 3 and the annular seal 4 are in each case present next to one another as individual parts. Starting from the form shown in FIG. 3a, the expanding ring 2, in a first step, is now pushed onto the corrugated tube 1, as is shown in FIG. 3b). In the second step, the annular seal 4 is arranged adjacent to the expanding ring 2 on the corrugated tube 1 according to FIG. 3c). In the third, final step, the combination of parts which is shown in FIG. 3c) is inserted into the coupling 3 and is fastened to the coupling 3 by the latching connection, as is shown in FIG. 3d).

I claim:

1. A connecting element for transporting gaseous, liquid or solid substances, comprising:
    a tubular coupling having an internal cylindrically running first recess in which a corrugated tube is arranged and an internal circular groove;
    a cylindrically extending second recess adjoining the first recess;
    an annular seal arranged adjacent to the first recess and within the second recess, the annular seal being further arranged to engage the corrugated tube from outside the tube;
    an expanding ring arranged adjacent to the annular seal and within the second recess, the expanding ring comprising a first and a second projection, the first projection extending towards the tubular coupling and arranged to engage the internal circular groove and the second projection extending towards the corrugated tube so as to engage the corrugated tube between corrugations; and
    the annular seal is arranged to engage the corrugated tube from outside the corrugated tube.

2. The connecting element according to claim 1, wherein the coupling comprises a first end for receiving the corrugated tube and a second end remote from the first end, the second end comprising raised lateral portions forming a mushroom shape.

* * * * *